(12) United States Patent
Shannon et al.

(10) Patent No.: US 8,395,638 B2
(45) Date of Patent: Mar. 12, 2013

(54) METHOD AND APPARATUS FOR CALIBRATING A DISPLAY-COUPLED COLOR MEASURING DEVICE

(75) Inventors: Colman Shannon, Lawrenceville, NJ (US); Cormic K. Merle, Rochester, NY (US); Michael H. Brill, Kingston, NJ (US); Brian Levey, Yardley, PA (US)

(73) Assignee: Datacolor Holding AG, Lucerne (CH)

( * ) Notice: Subject to any disclaimer, the term of this patent is extended or adjusted under 35 U.S.C. 154(b) by 1125 days.

(21) Appl. No.: 12/323,432

(22) Filed: Nov. 25, 2008

(65) Prior Publication Data

US 2009/0141042 A1   Jun. 4, 2009

Related U.S. Application Data

(60) Provisional application No. 60/991,115, filed on Nov. 29, 2007.

(51) Int. Cl.
  *G09G 5/02* (2006.01)
(52) U.S. Cl. ........................ 345/589; 348/180
(58) Field of Classification Search .................. 345/589; 348/180
  See application file for complete search history.

(56) References Cited

U.S. PATENT DOCUMENTS

| | | | |
|---|---|---|---|
| 5,892,585 A | 4/1999 | Lianza et al. | |
| 5,982,501 A | 11/1999 | Benz et al. | |
| 6,058,357 A | 5/2000 | Granger | |
| 6,163,377 A | 12/2000 | Boles et al. | |
| 6,784,995 B2 | 8/2004 | Merle et al. | |
| 6,980,231 B1 * | 12/2005 | Ohsawa | 348/188 |
| 7,133,133 B2 | 11/2006 | Merle et al. | |
| 7,391,514 B2 | 6/2008 | Merle et al. | |
| 2005/0007497 A1 | 1/2005 | Huang et al. | |
| 2005/0088389 A1 | 4/2005 | Ten | |
| 2006/0001873 A1 * | 1/2006 | Imura | 356/328 |
| 2006/0181552 A1 * | 8/2006 | Hopple | 345/690 |
| 2006/0215193 A1 * | 9/2006 | Shannon et al. | 358/1.9 |
| 2006/0233431 A1 | 10/2006 | Watanabe | |
| 2007/0285516 A1 * | 12/2007 | Brill et al. | 348/189 |
| 2008/0309968 A1 | 12/2008 | Berestov et al. | |
| 2009/0141042 A1 | 6/2009 | Shannon et al. | |

OTHER PUBLICATIONS

International Search Report and Written Opinion for PCT/US 08/85014; Feb. 4, 2009, copy consists of 9 unnumbered pages.
International Search Report and Written Opinion from PCT/US12/52870, Dec. 20, 2012, copy consists of 9 unnumbered pages.

* cited by examiner

*Primary Examiner* — Xiao M. Wu
*Assistant Examiner* — Scott E Sonners

(57) ABSTRACT

One embodiment of a method for calibrating a test color measurement device in conjunction with an emissive display includes measuring initial spectral sensitivities of at least four channels of the test color measurement device, linearly regressing the spectral sensitivities to a least-square best fit to CIE color matching functions, measuring CIE tristimulus values of test colors on the display using a reference color measurement device, measuring the CIE tristimulus values on the display using the test color measurement device, transforming the CIE tristimulus values measured by the test color measurement device to CIE tristimulus values that would have been measured by the reference color measurement device, using a nonlinear function with variable fitting coefficients, and storing initial fitting coefficient values that provide a least-square best fit of the CIE tristimulus values measured by the test color measurement device and the CIE tristimulus values measured by the reference color measurement device.

20 Claims, 3 Drawing Sheets

METHOD AND APPARATUS FOR CALIBRATING A DISPLAY-COUPLED COLOR MEASURING DEVICE

CROSS REFERENCE TO RELATED APPLICATIONS

This application claims the benefit of U.S. Provisional Patent Application Ser. No. 60/991,115, filed Nov. 29, 2007, which is herein incorporated by reference in its entirety.

BACKGROUND OF THE DISCLOSURE

Color displays, such as liquid crystal displays, tend to undergo color drift during their lifetime, and must be re-calibrated at regular intervals (e.g., using a calorimeter or other color measuring device) to render the proper colors. Conventional techniques for making color measurements of displays, however, tend to be very expensive. For instance, one conventional technique involves using a spectroradiometer (a device that measures light at about thirty wavelengths or more, where the measurements are combinable into Commission International de l'Éclairage (CIE) XYZ tristimulus values). However, the spectroradiometer's number of spectral channels makes its use expensive. Another conventional technique involves using a tristimulus calorimeter (a device that measures light in three channels, through filters whose efficiencies are close to the CIE color-matching functions $\bar{x}(\lambda)$, $\bar{y}(\lambda)$, and $\bar{z}(\lambda)$). However, the design of the tristimulus colorimeter's specific filters makes its use also expensive.

SUMMARY OF THE INVENTION

One embodiment of a method for calibrating a test color measurement device that is dedicated for use with a particular make and model of emissive display includes measuring initial spectral sensitivities of at least four channels of the test color measurement device, linearly regressing the spectral sensitivities to a least-square best fit to CIE color matching functions, measuring CIE tristimulus values of test colors on the display using a reference color measurement device, measuring the CIE tristimulus values on the display using the test color measurement device, transforming the CIE tristimulus values measured by the test color measurement device to CIE tristimulus values that would have been measured by the reference color measurement device, using a nonlinear function with variable fitting coefficients, and storing initial fitting coefficient values that provide a least-square best fit of the CIE tristimulus values measured by the test color measurement device and the CIE tristimulus values measured by the reference color measurement device. Because the calibration is specific to the particular make and model of emissive display (i.e., the color measurement device is calibrated for use with the particular emissive display—or type of emissive display—only), measurements made by the color measurement device exhibit improved accuracy, since the color measurement device will not have to address the differences between two or more different displays (or types of displays).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the invention is a method and apparatus for calibrating a display-coupled color measurement device, such as a colorimeter that is coupled to a liquid crystal display (LCD). Calibration of the color measurement device on a factory-calibrated display enables the color measurement device to record proper calorimetric values from the display, which in turn enables the color measurement device to properly re-calibrate the display as it exhibits color drift. Embodiments of the invention assume that the color of a display can be accurately measured by measuring the display through a plurality of filters, where the exact number of filters used is smaller than the number of spectral channels of a spectroradiometer, but large enough that individual filter spectra do not need to closely approximate the CIE $\bar{x}(\lambda)$, $\bar{y}(\lambda)$, and $\bar{z}(\lambda)$ color matching functions. This technique is less expensive than conventional color measurement techniques. Calibration of the display-coupled color measurement device used to make these measurements involves a two-step process.

Figure 1:
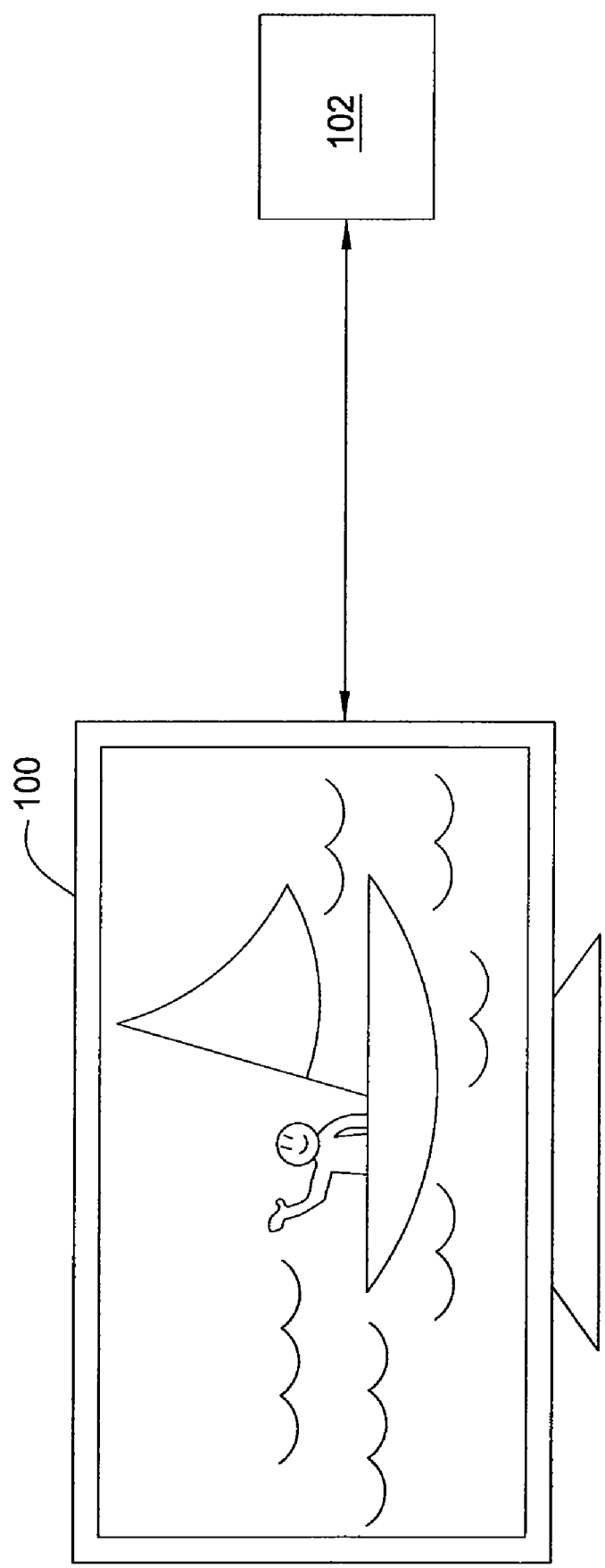
FIG. 1 is a schematic diagram illustrating one embodiment of a system that may be adapted for use in accordance with the present invention.

FIG. 1 is a schematic diagram illustrating one embodiment of a system that may be adapted for use in accordance with the present invention. The system includes a display 100, such as an LCD television and a color measurement device 102, such as a calorimeter, coupled to the display 100.

The color measurement device 102 comprises a plurality of channels, where each channel further comprises a filter/detector pair. In one embodiment, the color measurement device comprises at least four channels. Although the color measurement device 102 is illustrated in FIG. 1 as being external relative to the display 100, in alternative embodiments, the color measurement device 102 is embedded in the display 100. In this case, the color measurement device 102 may comprise a single silicon chip fronted by a plurality of integral color filters and detectors.

According to embodiments of the present invention, the display 100 is factory-calibrated. Subsequently, the factory-calibrated settings of the display 100 are used to calibrate the color measurement device 102. Thus, when the display 100 exhibits color drift in the future, the display-coupled color measurement device 102 can be used to re-calibrate the display 100 using display-specific color data. One embodiment of a method for calibrating the color measurement device 102 for use with the display 100 is discussed in further detail with respect to FIG. 2.

Figure 2:
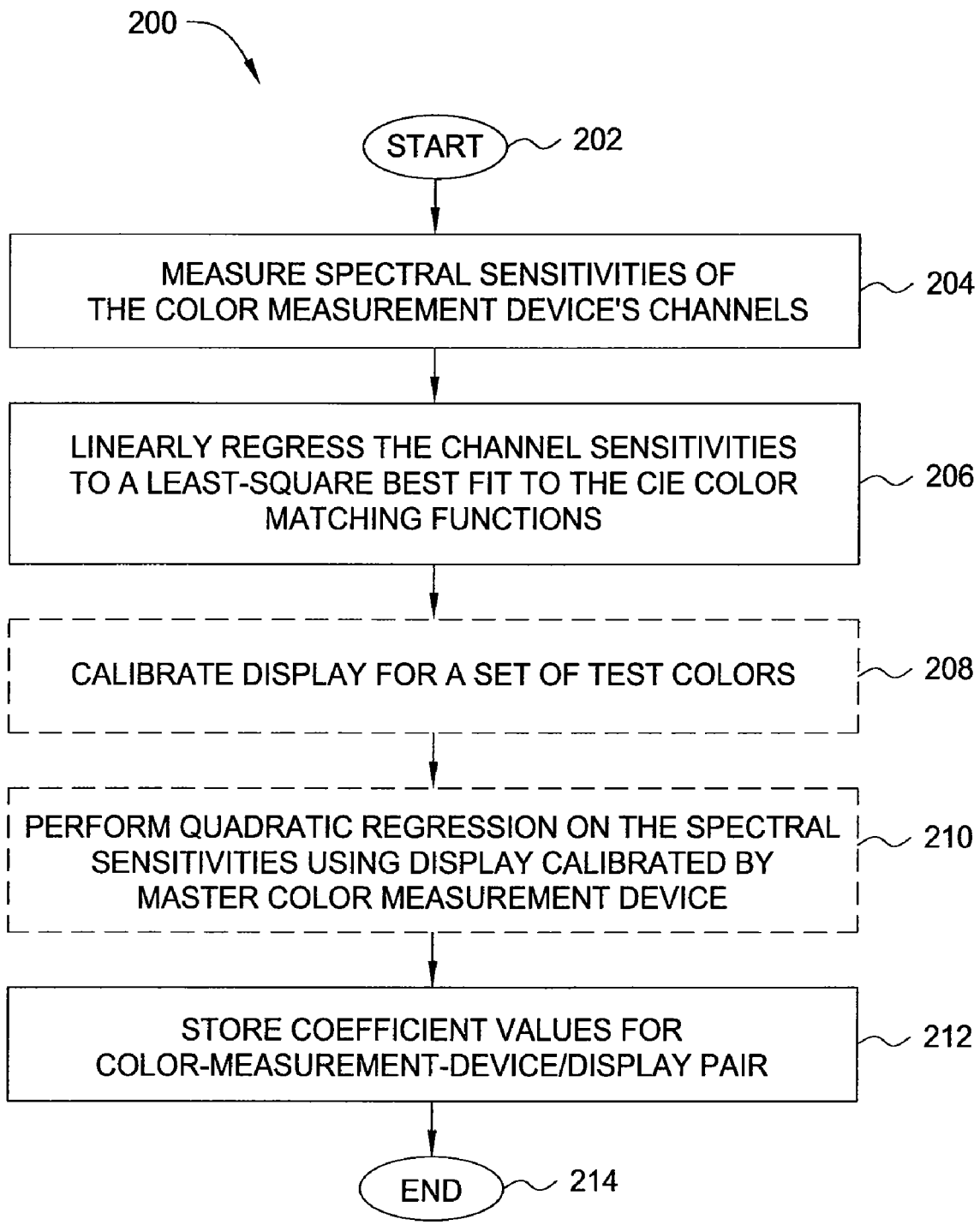
FIG. 2 is a flow diagram illustrating one embodiment of a method for calibrating a display-coupled color measurement device.

FIG. 2 is a flow diagram illustrating one embodiment of a method 200 for calibrating a display-coupled color measurement device. The color measurement device may, for instance, be coupled to an LCD, as illustrated in FIG. 1.

The method 200 is initialized at step 202 and proceeds to step 204, where the method 200 measures the spectral sensitivities $f_i(\lambda)$ of the color measurement device's channels. In one embodiment, the spectral sensitivities are inferred using a tunable light source, such as a white light coupled with a monochromator. In such an instance, it may be necessary to first calibrate (e.g., offline) the tunable light source before measuring the spectral sensitivities of the color measurement device's channels, since the tunable light source is likely to have an unknown spectral emission at each wavelength. In one embodiment, calibration of the tunable light source involves normalizing the output of the tunable light source by an efficiency of a calibrated light source. In one embodiment, a set of forty-one numbers (e.g., 380 nm to 780 nm in 10 nm increments) is created. This set of numbers comprises weighting factors $W(\lambda)=P_{max}/P(\lambda)$, where $P(\lambda)$ is the power from the tunable light source at wavelength $\lambda$, and $P_{max}$ is the maximum over $\lambda$ of $P(\lambda)$. In one embodiment, the function $P(\lambda)$ is measured by a master spectroradiometer.

Assuming the tunable light source is properly calibrated, in one embodiment, the spectral sensitivities of the color measurement device's channels are inferred by measuring the spectral sensitivities (e.g, with the tunable light source) and then multiplying these measurements by the weighting factors $W(\lambda)$.

In step 206, the method 200 calibrates the color measurement device by linearly regressing the color measurement device's inferred channel sensitivities $f_i(\lambda)$ to a least-square best fit to the CIE XYZ color matching functions (i.e., $\bar{x}(\lambda)$, $\bar{y}(\lambda)$, and $\bar{z}(\lambda)$ of the 1931 CIE system). The linear regression allows derivation of initial fitting coefficients $c_{xi}$, $c_{yi}$, and $c_{zi}$ that provide the least-square best fit. For example, $c_{xi}$ is derived by first taking the mean-square residual spectrum to be:

$$F_x(c_{x1},\dots,c_{xn}) = \sum_{\lambda=380}^{780}\left[\left\{\sum_{i=1}^{n} c_{xi} f_i(\lambda)\right\} - \bar{x}(\lambda)\right]^2 \quad \text{(EQN. 1)}$$

where $$\sum_{\lambda=380}^{780}$$

is calculated in 10 nm increments.

In one embodiment, EQN. 1 is modified for LCD applications by a weighing function $w(\lambda)$, as follows:

$$F_x(c_{x1},\dots,c_{xn}) = \sum_{\lambda=380}^{780} w^2(\lambda)\left[\left\{\sum_{i=1}^{n} c_{xi} f_i(\lambda)\right\} - \bar{x}(\lambda)\right]^2 \quad \text{(EQN. 2)}$$

where the weighing function $w(\lambda)$ characterizes the display (or display type/model) with which the colorimeter is to be coupled. That is the weighing function $w(\lambda)$ is particular to the display or type of display (make and model) with which the color measurement device is dedicated for use. In one embodiment (e.g., for an LCD or LED), $w(\lambda)$ is the spectral power distribution from the back light multiplied by the sum of the three color filters of the LCD in a full-white state. In another embodiment, $w(\lambda)$ is the spectral power distribution from the back-light (e.g., light emitting diode (LED) or fluorescent lamp) of an LCD. To solve the least-squares problem, the partial derivatives of $F_x$ in EQN. 1 or in EQN. 2 with respect to $c_{xi}$ are set to zero, and the resulting linear system is solved for $c_{xi}$. $c_{yi}$ and $c_{zi}$ are derived using analogous equations. The solution of the least-squares problem for EQN. 2 is analogous to the solution for EQN. 1, except the elements of a matrix to be inverted and the right-hand side vector are wavelength sums that are now weighted by $w^2(\lambda)$ (see Appendix A). The incorporation of a specific function $w^2(\lambda)$ is made possible by the fact that the colorimeter will always measure the same display, hence the function $w^2(\lambda)$ can be tailored to that display (in one embodiment, a display white of an LCD).

Steps 204-206 may thus be viewed as a first level of calibration, with resultant output of the first level being the initial fitting coefficients $c_{xi}$, $c_{yi}$, and $c_{zi}$. However, because the plurality of filters incorporated in the channels of the color measurement device may not be a perfect match to the color matching functions $\bar{x}(\lambda)$, $\bar{y}(\lambda)$, and $\bar{z}(\lambda)$, it may be desirable in some embodiments to incorporate a second level of calibration embodied in steps 208-210 in order to refine the initial fitting coefficients $c_{xi}$, $c_{yi}$, and $c_{zi}$.

Thus, in optional step 208 (illustrated in phantom), the method 200 calibrates the display (i.e., either the display under test or another display of the same make and model) for a set of known test colors, using a master (reference) color measurement device, such as a spectroradiometer. In one embodiment, the set of known test colors comprises twenty-six test colors. The calibration of the display yields a set of target X, Y, and Z tristimulus values for the master color measurement device.

Then in optional step 210 (illustrated in phantom), the method 200 uses the set of test colors rendered on the calibrated display to perform a quadratic (second-order polynomial) regression on the initial X, Y, and Z tristimulus associated with the initial fitting coefficients $c_{xi}$, $c_{yi}$, and $c_{zi}$. This produces refined (final) X, Y, and Z tristimulus values. Specifically, the method 200 nonlinearly transforms the initial X, Y, and Z tristimulus values derived from step 206 to improve conformity with the target X, Y, and Z tristimulus values measured from the calibrated display in step 208. The use of specific coefficient values in the above nonlinear transformation is made more effective by the fact that the colorimeter will always measure the same display, hence the coefficient values are tailored to that display (in one embodiment, an LCD).

For example, supposed that the initial X, Y, and Z tristimulus values derived in step 206 for the color j are $X_j$, $Y_j$, and $Z_j$ (where j=1, M; and M is the number of test colors in the set of text colors). Further suppose that the target X, Y, and Z tristimulus values derived in step 208 are $X_{Tj}$, $Y_{Tj}$, and $Z_{Tj}$. The object of step 208 is therefore to find the twenty-seven constants (refined fitting coefficients) $k_{xi}$, $k_{yi}$, and $k_{zi}$ (i=1, 8) that produce the least-square best fit to $X_{Tj}$, $Y_{Tj}$, and $Z_{Tj}$ of the respective quantities:

$$X_{fj}=k_{x1}X_j+k_{x2}Y_j+k_{x3}Z_j+k_{x4}X_jY_j+k_{x5}X_jZ_j+k_{x6}Y_jZ_j+ k_{x7}X_j^2+k_{x8}Y_j^2+k_{x9}Z_j^2$$

$$Y_{fj}=k_{y1}X_j+k_{y2}Y_j+k_{y3}Z_j+k_{y4}X_jY_j+k_{y5}X_jZ_j+k_{y6}Y_jZ_j+ k_{y7}X_j^2+k_{y8}Y_j^2+k_{y9}Z_j^2$$

$$Z_{fj}=k_{z1}X_j+k_{z2}Y_j+k_{z3}Z_j+k_{z4}X_jY_j+k_{z5}X_jZ_j+k_{z6}Y_jZ_j+ k_{z7}X_j^2+k_{z8}Y_j^2+k_{z9}Z_j^2$$

where these expressions are non-linear in the measured X, Y, and Z tristimulus values, but linear in the fitting coefficients $k_{xi}$, $k_{yi}$, and $k_{zi}$. Therefore, one can easily solve for the fitting coefficients.

In one embodiment, the method 200 defines an M×9 matrix, D, of color measurement device-measured X, Y, X tristimulus values from the M test colors. The $j^{th}$ row vector of D is:

$$D_j=[X_j\ Y_j\ Z_j\ X_jY_j\ X_jZ_j\ X_j^2\ Y_j^2\ Z_j^2] \quad \text{(EQN. 3)}$$

In one embodiment, the method 200 defines a 3×9 matrix, C, of refined fitting coefficients to be solved as:

$$C = \begin{bmatrix} k_{x1} & k_{x2} & k_{x3} & k_{x4} & k_{x5} & k_{x6} & k_{x7} & k_{x8} & k_{x9} \\ k_{y1} & k_{y2} & k_{y3} & k_{y4} & k_{y5} & k_{y6} & k_{y7} & k_{y8} & k_{y9} \\ k_{z1} & k_{z2} & k_{z3} & k_{z4} & k_{z5} & k_{z6} & k_{z7} & k_{z8} & k_{z9} \end{bmatrix} \quad \text{(EQN. 4)}$$

In one embodiment, the method 200 defines an M×3 matrix, B, of target X, Y, and Z tristimulus values, whose $j^{th}$ row is given by:

$$B_j = [X_{Tj}\, Y_{Tj}\, Z_{Tj}] \quad \text{(EQN. 5)}$$

The least-square problem is then to find C such that, as closely as possible:

$$B = DC^T \quad \text{(EQN. 6)}$$

where T stands for matrix transposition. The solution for C is to apply the pseudoinverse of D to both sides of EQN. 6:

$$C^T = (D^T D)^{-1} D^T B \quad \text{(EQN. 7)}$$

In step 212, the method 200 stores the fitting coefficients (i.e., either the initial fitting coefficients, if only one level of calibration is implemented, or the refined fitting coefficients, if two levels of calibration are implemented) for the color measurement device/display pair. In one embodiment, the fitting coefficients are stored in the display. The method 200 then terminates in step 214.

The storage of the fitting coefficients allows them to be used as a lookup table for future calibrations with the color measurement device on the display. Given a matrix C computed from EQN. 7, the refined tristimulus values ($X_f$, $Y_f$, and $Z_f$) of any color subsequently measured by the color measurement device on the display are computed from the initial tristimulus values (X, Y, and Z, e.g., as derived in step 206) by:

$$[X_f\, Y_f\, Z_f] = [X\, Y\, Z\, XY\, XZ\, YZ\, X^2\, Y^2\, Z^2] C^T \quad \text{(EQN. 8)}$$

Applied to a scanner of reflecting samples (e.g., as described by Jon Y. Hardeberg in Chapter 3 of "Acquisition and Reproduction of Color Images: Colorimetric and Multispectral Approaches," first (French) edition published in 1999 by Ecole Nationale Superieure de Telecommunications, Paris; second (English) edition published in 2001 by Universal Publishers, Parkland, Fla., which is herein incorporated by reference in its entirety), the method 200 achieves accuracy of between two and three CIELAB ΔE values from a second-order regression. Even greater accuracy is achievable when one uses a color measuring device having more than three channels (as a stand-in for the scanner) to perform steps 204-206 and then measures a display that is inherently designed with only three degrees of freedom in its control. This holds even if the scanner or color measurement device is a completely linear device whose linearity is compromised by the second-order polynomial regression of step 210.

In one embodiment, the constant terms in the second-order polynomial regression are set to zero, leaving twenty-seven coefficients to determine. This preserves the black point independently of the test colors, effectively giving black a very high weight. This can prove advantageous for display applications.

In one embodiment of the present invention, the color measurement device is not just coupled to the display, but is actually embedded in the display. For example, the color measurement device may be embedded in the screen-opposing surface of a hinged display system, such as a cellular telephone keypad or a laptop computer, such that when the hinge is closed, the measurement and calibration processes can occur in a substantially ambient light-free environment. In another embodiment, the color measurement device is coupled to a hinged display, but not embedded therein. In yet another embodiment, the color measurement device is attached to an attachment arm of the display (e.g., as in the case of a stand-alone display).

Figure 3:
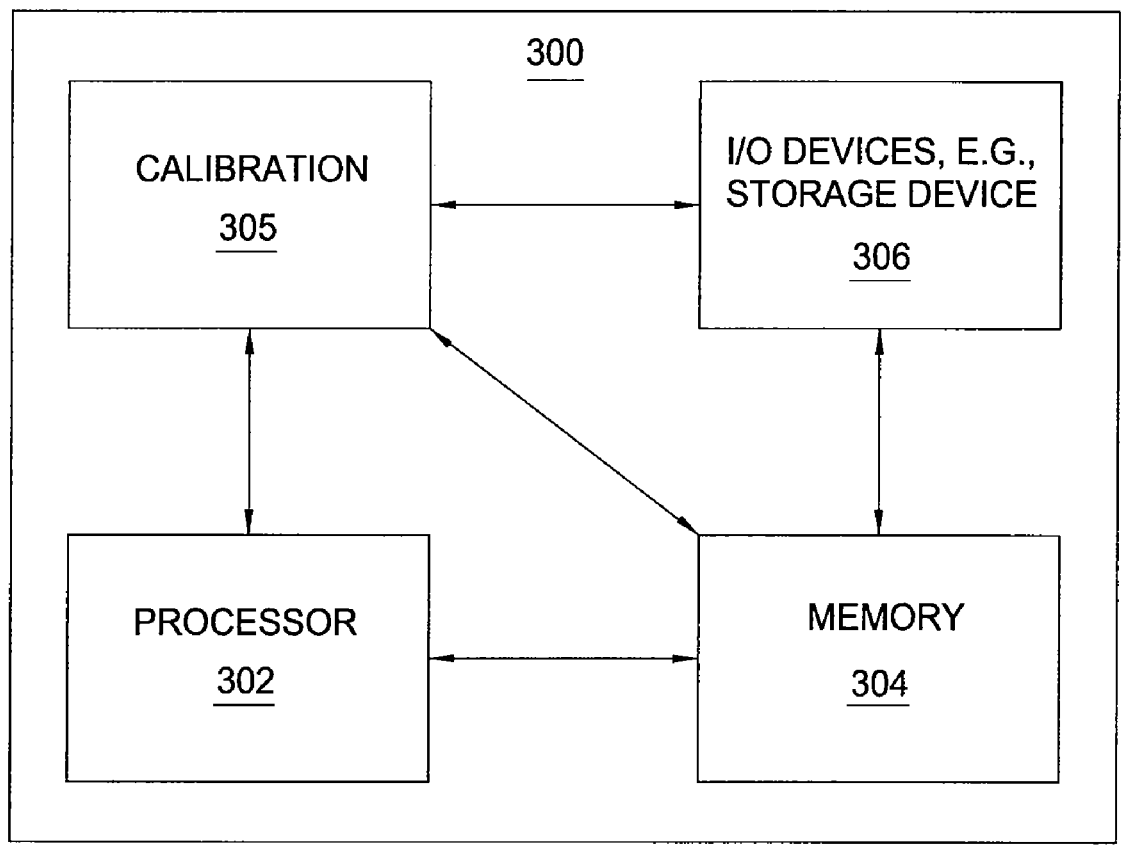
FIG. 3 is a high level block diagram of the calibration method that is implemented using a general purpose computing device.

FIG. 3 is a high level block diagram of the calibration method that is implemented using a general purpose computing device 300. In one embodiment, a general purpose computing device 300 comprises a processor 302, a memory 304, a calibration module 305 and various input/output (I/O) devices 306 such as a display, a keyboard, a mouse, a modem, a network connection and the like. In one embodiment, at least one I/O device is a storage device (e.g., a disk drive, an optical disk drive, a floppy disk drive). It should be understood that the calibration module 305 can be implemented as a physical device or subsystem that is coupled to a processor through a communication channel.

Alternatively, the calibration module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one embodiment, the calibration module 305 for calibrating a color measurement device for use with a display described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

APPENDIX A

Solution to the Weighted Least-Square Problem

From EQN. 2, the quantity to be minimized is:

$$F_x(c_{x1}, \ldots, c_{xn}) = \sum_{\lambda=380}^{780} w^2(\lambda) \left[ \left\{ \sum_{i=1}^{n} c_{xi} f_i(\lambda) \right\} - \bar{x}(\lambda) \right]^2 \quad \text{(A1)}$$

Abbreviating the wavelength sum to "< >" results in:

$$F_x(c_{x1}, \ldots, c_{xn}) = \left\langle w^2 \left[ \left\{ \sum_{i=1}^{n} c_{xi} f_i \right\} - \bar{x} \right]^2 \right\rangle \tag{A2}$$

Setting to zero the partial derivative of $F_x$ with respect to yields $c_{xj}$ yields:

$$\sum_{i=1}^{n} \langle f_j f_i w^2 \rangle c_{xi} = \langle f_j \bar{x} w^2 \rangle \tag{A3}$$

Now denote by M the n-by-n matrix with components $M_{ij} = \langle f_j f_i w^2 \rangle$; denote by $c_x$ the n-vector with components $c_{xi}$; and denote by $v_x$ the n-vector with components $v_{xi} = \langle f_i \bar{x} w^2 \rangle$. Then:

$$M c_x = v_x \tag{A4}$$

which can be multiplied by the inverse of M to yield a solution for the coefficient vector:

$$c_x = M^{-1} v_x \tag{A5}$$

What is claimed is:

1. A method for calibrating a test color measurement device that is dedicated for use with a particular make and model of emissive display, comprising:
    measuring initial spectral sensitivities of at least four channels of the test color measurement device;
    linearly regressing the initial spectral sensitivities to a least-square best fit to Commission International de l'Éclairage (CIE) color matching functions;
    measuring CIE tristimulus values of a set of known test colors on the emissive display using a reference color measurement device;
    measuring the CIE tristimulus values on the emissive display using the test color measurement device;
    transforming the CIE tristimulus values as measured by the test color measurement device to the CIE tristimulus values as measured by the reference color measurement device, using a nonlinear function with variable fitting coefficients; and
    storing a set of initial fitting coefficient values that provide a least-square best fit of the CIE tristimulus values as measured by the test color measurement device and the CIE tristimulus values as measured by the reference color measurement device.

2. The method of claim 1, wherein measuring the initial spectral sensitivities is performed using a tunable light source that has been calibrated offline.

3. The method of claim 1, wherein measuring the initial spectral sensitivities comprises:
    measuring the spectral sensitivities; and
    multiplying the spectral sensitivities by a set of weighting factors.

4. The method of claim 1, wherein the initial fitting coefficient values are stored in the emissive display.

5. The method of claim 1, wherein the test color measurement device is coupled to the emissive display.

6. The method of claim 5, wherein the emissive display is a liquid crystal display.

7. The method of claim 5, wherein the test color measurement device is embedded in the emissive display.

8. The method of claim 1, wherein the nonlinear function is a quadratic regression.

9. The method of claim 1, wherein the linearly regressing is performed using a weighting function particular to a type of the emissive display.

10. A non-transitory computer readable storage medium containing an executable program for calibrating a test color measurement device that is dedicated for use with a particular make and model of emissive display, where the program performs the steps of:
    measuring initial spectral sensitivities of at least four channels of the test color measurement device;
    linearly regressing the initial spectral sensitivities to a least-square best fit to Commission International de l'Éclairage (CIE) color matching functions;
    measuring CIE tristimulus values of a set of known test colors on the emissive display using a reference color measurement device;
    measuring the CIE tristimulus values on the emissive display using the test color measurement device;
    transforming the CIE tristimulus values as measured by the test color measurement device to the CIE tristimulus values as measured by the reference color measurement device, using a nonlinear function with variable fitting coefficients; and
    storing a set of initial fitting coefficient values that provide a least-square best fit of the CIE tristimulus values as measured by the test color measurement device and the CIE tristimulus values as measured by the reference color measurement device.

11. The non-transitory computer readable storage medium of claim 10, wherein measuring the initial spectral sensitivities is performed using a tunable light source that has been calibrated offline.

12. The non-transitory computer readable storage medium of claim 10, wherein measuring the initial spectral sensitivities comprises:
    measuring the spectral sensitivities; and
    multiplying the spectral sensitivities by a set of weighting factors.

13. The non-transitory computer readable storage medium of claim 10, wherein the initial fitting coefficient values are stored in the emissive display.

14. The non-transitory computer readable storage medium of claim 10, wherein the test color measurement device is coupled to the emissive display.

15. The non-transitory computer readable storage medium of claim 14, wherein the emissive display is a liquid crystal display.

16. The non-transitory computer readable storage medium of claim 14, wherein the test color measurement device is embedded in the emissive display.

17. The non-transitory computer readable storage medium of claim 9, wherein the nonlinear function is a quadratic regression.

18. The non-transitory computer readable storage medium of claim 10, wherein the linearly regressing is performed using a weighting function particular to a type of the emissive display.

19. A system, comprising:
    an emissive display; and
    a test color measurement device dedicated for use with the emissive display, the color measurement device comprising at least four channels, wherein the test color measurement device is calibrated for use with the emissive display by:
        measuring initial spectral sensitivities of at least four channels of the test color measurement device;

linearly regressing the initial spectral sensitivities to a least-square best fit to Commission International de l'Éclairage (CIE) color matching functions;

measuring CIE tristimulus values of a set of known test colors on the emissive display using a reference color measurement device;

measuring the CIE tristimulus values on the emissive display using the test color measurement device;

transforming the CIE tristimulus values as measured by the test color measurement device to the CIE tristimulus values as measured by the reference color measurement device, using a nonlinear function with variable fitting coefficients; and storing a set of initial fitting coefficient values that provide a least-square best fit of the CIE tristimulus values as measured by the test color measurement device and the CIE tristimulus values as measured by the reference color measurement device.

20. The system of claim 19, wherein the test color measurement device is embedded in the emissive display.

* * * * *

UNITED STATES PATENT AND TRADEMARK OFFICE
CERTIFICATE OF CORRECTION

PATENT NO. : 8,395,638 B2
APPLICATION NO. : 12/323432
DATED : March 12, 2013
INVENTOR(S) : Colman Shannon et al.

Page 1 of 1

It is certified that error appears in the above-identified patent and that said Letters Patent is hereby corrected as shown below:

In the Specifications

Col. 1, Line 16: Delete "calorimeter" and insert -- colorimeter --, therefor.

Col. 1, Line 26: Delete "calorimeter" and insert -- colorimeter --, therefor.

Col. 2, Line 18: Delete "calorimetric" and insert -- colorimetric --, therefor.

Col. 2, Line 36: Delete "calorimeter," and insert -- colorimeter, --, therefor.

Col. 4, Line 56: Delete "$k_{x3}Z_j$" and insert -- $k_{z3}Z_j$ --, therefor.

Col. 5, Line 21: Delete "$(D^T D)$" and insert -- $(D^T D)^{-1}$ --, therefor.

Signed and Sealed this
Twenty-second Day of April, 2014

Michelle K. Lee
*Deputy Director of the United States Patent and Trademark Office*